United States Patent [19]

Heller

[11] Patent Number: 5,401,220
[45] Date of Patent: Mar. 28, 1995

[54] SPEED REDUCER WITH PLANOCENTRIC GEAR ARRANGEMENT

[75] Inventor: Werner H. Heller, West Valley, N.Y.

[73] Assignee: Peerless-Winsmith, Inc., Springville, N.Y.

[21] Appl. No.: 99,495

[22] Filed: Jul. 28, 1993

[51] Int. Cl.⁶ .............................................. F16H 1/32
[52] U.S. Cl. ...................................... 475/180; 475/344
[58] Field of Search ...................... 475/180, 343, 344

[56] References Cited

U.S. PATENT DOCUMENTS

| | | | |
|---|---|---|---|
| 1,968,604 | 7/1934 | Hertz et al. | 74/305 |
| 2,231,784 | 2/1941 | Von Thüngen | 74/306 |
| 2,496,857 | 2/1950 | Cronstedt et al. | 74/410 |
| 2,830,473 | 4/1958 | Brown | 74/802 |
| 3,943,780 | 3/1976 | Klaue | 74/15.86 |
| 4,106,366 | 8/1978 | Altenbokum et al. | 74/801 |
| 4,440,044 | 4/1984 | Heller | 475/162 |
| 4,524,643 | 6/1985 | Ziegler et al. | 74/801 |
| 5,145,467 | 9/1992 | Periou et al. | 475/162 |
| 5,189,923 | 3/1993 | Lashbrook | 74/409 |

FOREIGN PATENT DOCUMENTS 100810 2/1984 European Pat. Off. .
2283939 11/1990 Japan .

OTHER PUBLICATIONS

Contract Report entitled, "Development of a Low-Cost Drive Tracking Mechanism for Solar-Heliostats or PV Arrays," Peerless-Winsmith, Inc., Document No. 90-5753, dated Feb. 1989.

*Primary Examiner*—Dirk Wright
*Attorney, Agent, or Firm*—Nies, Kurz, Bergert & Tamburro

[57] ABSTRACT

A two-stage speed reducer including a planocentric gear arrangement which has a rotatable output ring gear and a planet gear mounted within the ring gear for orbital movement. The teeth on the ring gear and the planet gear are tapered to permit axial adjustment of the planet gear with respect to the ring gear and thereby eliminate backlash between the two. Adjustment means is provided to permit axial adjustment of the planet gear with respect to the ring gear. After a period of use of the speed reducer, the planet gear may be readjusted axially relative to the ring gear to compensate for backlash created between the teeth of the planet gear and ring gear due to wear.

14 Claims, 4 Drawing Sheets

SPEED REDUCER WITH PLANOCENTRIC GEAR ARRANGEMENT

BACKGROUND OF THE INVENTION

This invention relates generally to speed reducers and, more particularly, to a two-stage speed reducer capable of achieving very high reduction ratios, and including a planocentric gear arrangement having an output ring gear and an eccentric planet gear which is axially adjustable with respect to the ring gear to allow for backlash adjustment between the gears from outside the gearbox.

Speed reducers for achieving extremely high reduction radios have been proposed in the past and these commonly include primary and secondary reduction stages, with at least one of those stages being a planocentric gear arrangement. A typical prior art gear reducer is illustrated in U.S. Pat. No. 4,440,044.

The planocentric gear arrangement commonly includes an output ring gear and a planet gear, with the planet gear having only a few teeth less than the number of teeth on the ring gear. For example, it is not unusual for the planet gear to have only one to four teeth less than the teeth on the ring gear to provide for maximum reduction of speed from the planet gear to the ring gear. Consequently, the gear teeth must be precisely machined and the gears must be carefully assembled with sufficient clearance to avoid an interference condition, but yet must not be provided with excessive clearance that will produce a backlash condition.

In addition, over a period of time, as the ring gear and planet gear run together, the mating teeth surfaces become worn and excessive backlash develops within the gear arrangement.

SUMMARY OF THE INVENTION

Accordingly, it is a primary object of this invention to provide a speed reducer which includes a planocentric gear arrangement, having a rotatable output ring gear and a planet gear that moves with orbital motion within the ring gear. The teeth on the ring gear and the planet gear are tapered to permit axial adjustment of the planet gear with respect to the ring gear to adjust for backlash.

Still another object of the invention resides in the provision of the above novel gear reducer which includes externally accessible adjusting means for adjusting the set position of the planet gear axially with respect to the ring gear and spring means acting against the planet gear to maintain the planet gear in its set position.

Still another object of the invention resides in the abovementioned novel gear reducer in which the planet gear is mounted for orbital movement within the ring gear on a plurality of eccentric sections formed on support shafts. Adjusting means permits readjustment of the planet gear axially with respect to the ring gear to eliminate backlash between the teeth of the gears produced by wear after use.

These and other objects of the invention will become more apparent from reading the following detailed description of the invention in which reference is made to the accompanying drawing wherein like numerals indicate like elements.

DETAILED DESCRIPTION OF THE INVENTION

Figure 1:
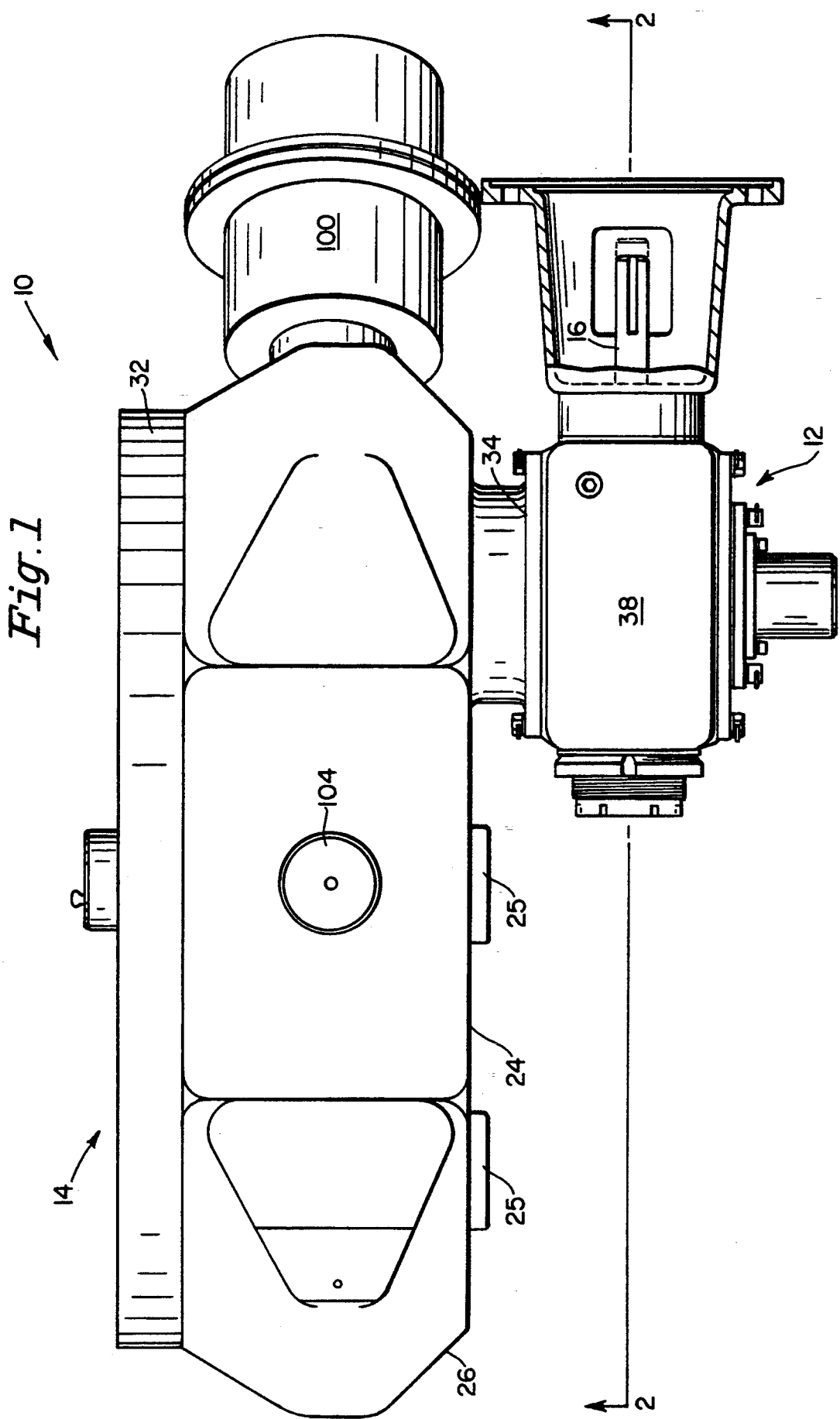
FIG. 1 is a fragmentary side elevational view of the gear reducer of the invention.
Figure 2:
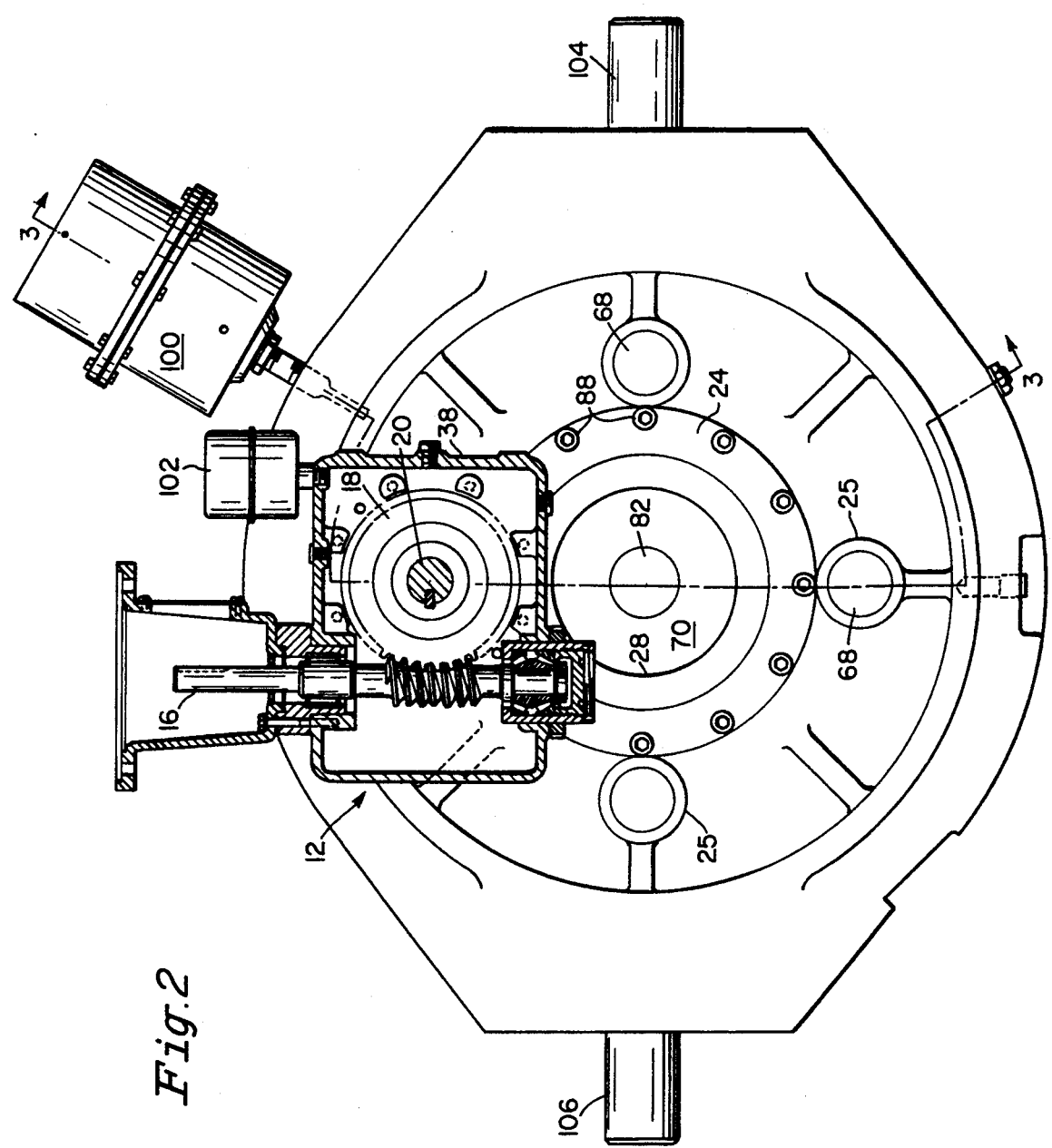
FIG. 2 is a fragmentary plan view taken generally along line 2—2 of FIG. 1.

The novel gear reducer 10 of the invention includes a primary reduction stage 12 having a speed reduction ratio of approximately 14.5 to 1 and a secondary gear stage 14 formed by a planocentric gear arrangement which provides a speed reduction ratio of approximately 74 to 1. Primary stage 12 is of the worm gear type and includes an input worm shaft 16 driving worm wheel 18 which is fixed on output shaft 20.

Figure 3:
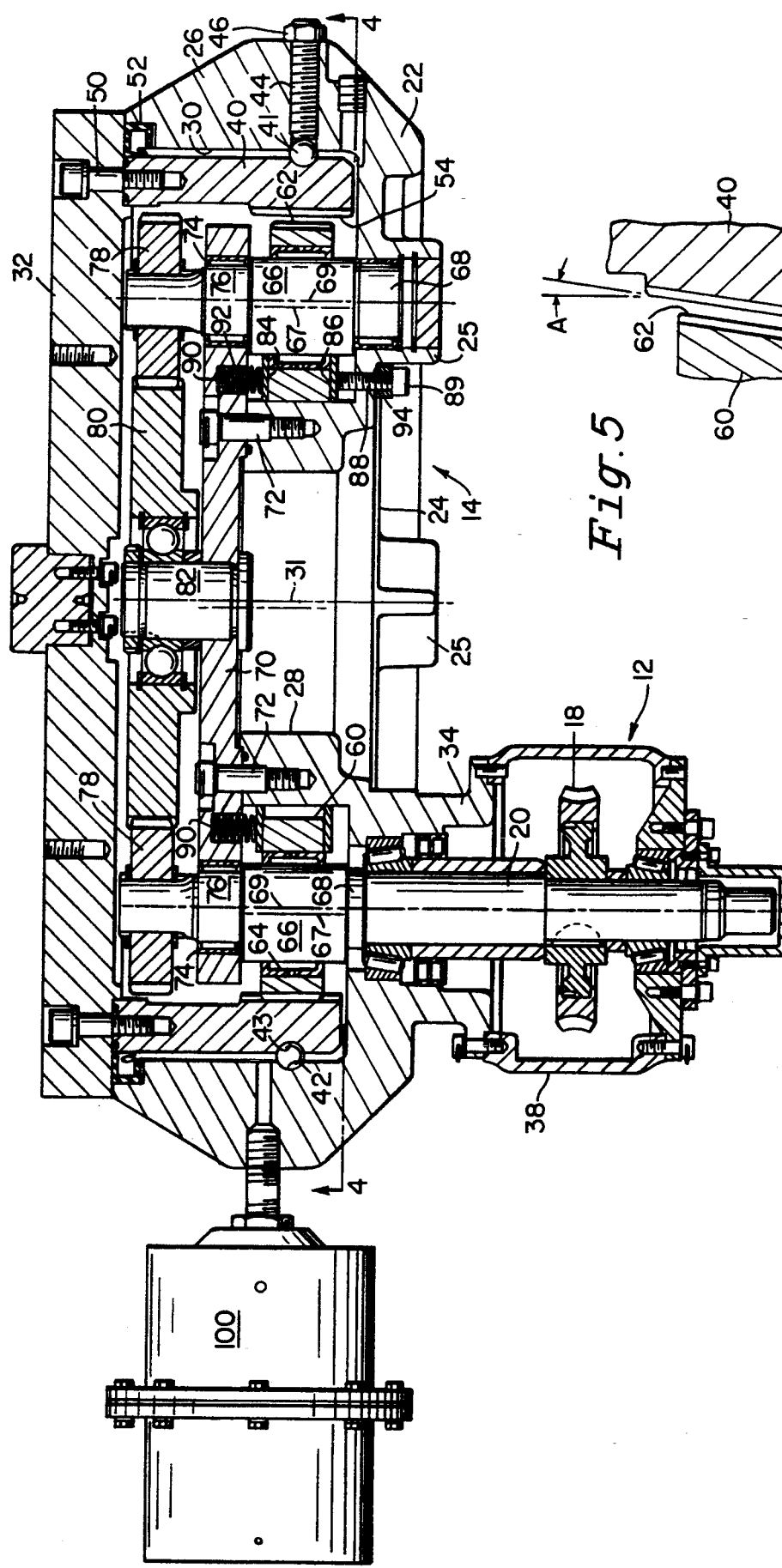
FIG. 3 is a fragmentary sectional view of the gear reducer taken generally along line 3—3 of FIG. 2.

Secondary stage 14 includes a main housing assembly 22 having an end wall 24 joined by a longitudinally extending peripheral side wall 26 and a central hub section 28, all of which are properly machined as needed to accommodate the various parts of the gear reducer. Side wall 26 and hub section 28 define a cylindrical chamber 30 having a central axis 31 and open at its upper end (FIG. 3). A mounting flange 34 extends downwardly from end wall 24 and housing 38 of the worm gear unit 12 connects to flange 34.

The planocentric gear arrangement of secondary stage 14 includes an output ring gear 40 rotatably mounted about axis 31 from side wall 26 by a plurality of balls 41 which ride within opposing annular grooves 42 and 43 in side wall 26 and ring gear 40. Balls 41 are put in place through a threaded opening 44 in wall 26, with the opening 44 ultimately being closed by a threaded plug 46 to hold the balls in place. The balls not only permit rotation of ring gear 40 but also prevent the ring gear from being axially displaced with respect to wall 26. A cover plate 32 is attached to ring gear 40 by a plurality of cap screws 50 so that any element attached to the cover plate rotates with ring gear 40. An end seal assembly 52 is positioned between cover plate 32, ring gear 40, and flange section 26. Ring gear 40 is provided with a plurality of internal teeth 54 which taper axially inwardly from top to bottom as shown in FIGS. 3 and 5 at a small angle A of about 1° for a reason which will become evident.

Figure 5:
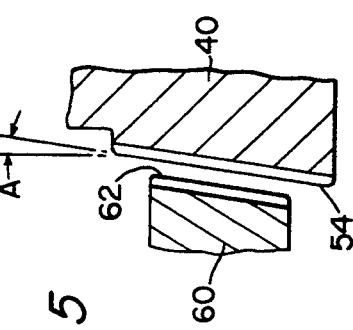
FIG. 5 is an enlarged fragmentary sectional view illustrating the matching taper (at an exaggerated angle) on the external and internal gear teeth of the planet gear and the ring gear, respectively.

Ring gear 40 is driven from output shaft 20 of the primary worm gear unit 12 by way of a single planet gear 60 of annular configuration, the planet gear having a plurality of external teeth 62 which also taper axially inwardly from top to bottom as shown in FIGS. 3 and 5 on an angle of about 1°, matching the angle of taper of teeth 54 on ring gear 40. The number of teeth 62 on planet gear 60 will be slightly less than the number of teeth 54 on ring gear 40. For example, planet gear 60 may have 219 teeth, while ring gear 40 may have 222 teeth.

Figure 4:
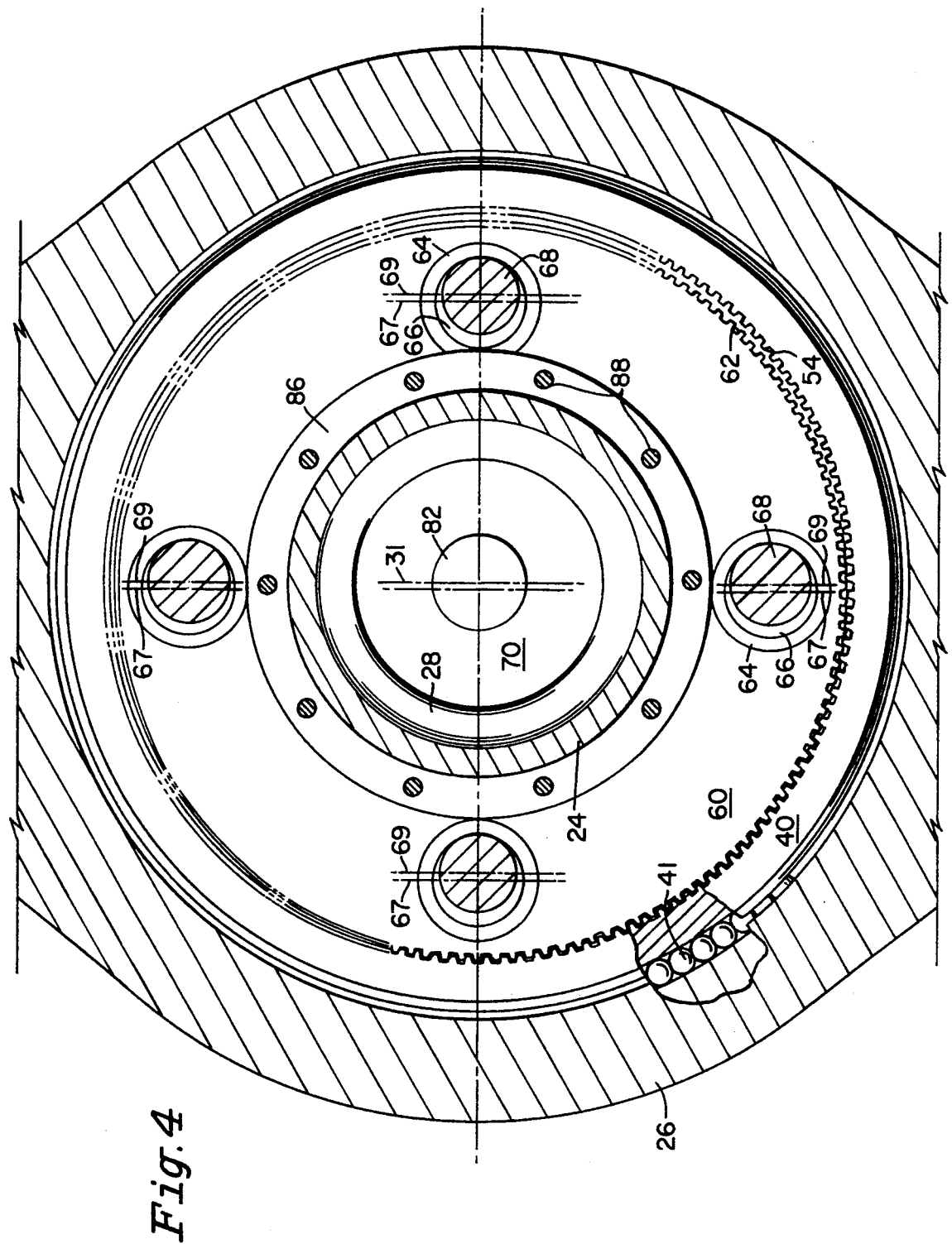
FIG. 4 is a fragmentary sectional view taken generally along line 4—4 of FIG. 3.

Planet gear 60 is mounted via four needle bearings 64 on an eccentric section 66 formed on each of planet support shafts 68 which rotate about axes 69 that are parallel to axis 31 as best shown in FIGS. 3 and 4. One of the planet shafts 68 is formed integrally on the end of output shaft 20 so as to be driven from the primary gear stage 12.

A circular mounting plate 70 is mounted on top of hub section 28 by way of cap screws 72 and supports a plurality of needle bearings 74 which rotatably receive upper sections 76 of planet shafts 68. The lower ends of shafts 68 are rotatably supported within bosses 25 formed on end wall 24. All of the shafts 68 are interconnected at their upper ends by spur gears 78 and a central idler gear 80 which is rotatably mounted on a trunnion pin 82 fixed on the center line 31 of mounting plate 70.

As shown best in FIGS. 3 and 4, rotation of the shafts 68 and all gears connected to them are timed in such a way that the center lines 67 of all eccentric sections 66 are parallel with each other, with the throw of each eccentric being in the same direction to cause the eccentrics to rotate in unison. The rotation of the eccentrics 66 causes an orbital motion of planet gear 60 inside ring gear 40. For each full rotation of eccentrics 66, the mesh point between planet gear 60 and ring gear 40 makes one complete orbit causing ring gear 40 to rotate an amount equal to the difference in the number of teeth between ring gear 40 and planet gear 60. As mentioned above, the ring gear may have 222 teeth while the planet gear may have 219 teeth. Therefore, it will take 222/222−219=74 revolutions of eccentrics 66 to complete one revolution of output ring gear 40.

As noted above, teeth 54 on ring gear 40 and teeth 62 on planet gear 60 are formed on a matching taper of 1°. Not only does this facilitate assembly of planet gear 60 within ring gear 40 but it also enables axial adjustment of planet gear 60 with respect to ring gear 40 to virtually eliminate backlash between teeth 54 and 62 during the initial assembly process. It also permits readjustment axially of the gears with respect to each other after use to eliminate backlash which may occur because of wear.

As shown in FIGS. 3 and 4, a pair of upper and lower friction and support rings 84 and 86 are mounted around hub 28 on opposite sides of planet gear 60 which can slide transversely between the rings. A plurality of adjusting screws 88, equally spaced around axis 31, thread upwardly through end wall 24, are all of the same length, and have flat polished end faces which bear against support ring 86. A plurality of compression springs 90 are mounted in counterbores 92 in mounting plate 70, and each spring 90 bears against upper support ring 84 at a location directly opposite an adjusting screw 88. The axial position of each of the adjusting screws 88 is determined by the length of a precisely machined spacer 94, located between the head 89 of the screw and wall 24, and the axial position of the adjusting screws 88 in turn determine the axial position of planet gear 60 with respect to ring gear 40. The combined spring force of compression springs 90 exceeds the weight of planet gear 60 and support rings 84 and 86, thereby assuring that planet gear 60 and needle bearings 64 are maintained axially on eccentrics 66 at a desired axial position with respect to ring gear 40 regardless of the orientation of housing 22. The matching taper on teeth 54 and 62 permit backlash to be eliminated as planet gear 60 is axially lowered with respect to ring gear 40 as screws 88 are backed off and the length or height of spacers 94 is increased.

As mentioned, the adjusting screws 88 are all of the same length and have flat polished end faces. By selecting a desired length of machine spacers 94, the axial position of planet gear 60 can be adjusted for any desired amount of backlash. Because the total sum of the spring forces provided by compression springs 90 exceeds the weight of the planet gear and support rings 84 and 86, the axial position of the planet gear is maintained regardless of the orientation of housing 22. The planet gear can be positioned axially with respect to the ring gear at any position within the axial length of teeth 54 to adjust for backlash. This can be done at initial assembly, and after some wear has occurred following operation of the speed reducer merely by readjusting the position of screws 88 and the height or length of spacers 94 which are readily accessible from outside of housing 22.

An expansion chamber 100 is connected to housing 26 and expansion chamber 102 is connected to housing 38. The entire housing 22 may be mounted for pivoting action in a suitable support by way of trunnion shafts 104 and 106.

As described above, the two-stage reduction unit 10 provides a total speed reduction of 1073 to 1 resulting from the gear ratio of 14.5 to 1 of the first stage 12 multiplied by the gear ratio of 74 to 1 of the planocentric gear arrangement in the secondary stage 14.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A speed reducer comprising a housing having end wall means and side wall means extending longitudinally from said end wall means and defining a chamber, a ring gear mounted within said chamber for rotation about a central axis, said ring gear having a plurality of internal teeth tapered axially inwardly toward said end wall means, a planet gear mounted within said ring gear and having a plurality of external teeth which mesh with and match the taper of said internal teeth on said ring gear, means mounting said planet gear for orbital motion within said ring gear, adjustment means for setting the axial position of said planet gear relative to said ring gear, spring means urging said planet gear against said adjustment means to maintain said planet gear in its set axial position, and drive means connected to said planet gear for causing orbital movement of said planet gear within said ring gear, thereby causing rotational movement of said ring gear about said central axis.

2. The speed reducer of claim 1, said adjustment means including a plurality of adjusting screws extending through said end wall means and establishing said set axial position of said planet gear, said adjusting screws being readily accessible from outside said housing to permit readjustment of said set axial position.

3. The speed reducer of claim 2, whereby said adjusting screws may be adjusted to permit said planet gear to move toward said end wall means along the taper of the teeth to eliminate backlash between the teeth on said ring gear and said planet gear.

4. The speed reducer of claim 1, wherein said means mounting said planet gear for orbital motion comprises a plurality of support shafts rotatably mounted in said housing on axes parallel to said central axis, each support shaft having an eccentric section extending through and rotatable with respect to said planet gear, said drive means being connected to one of said support shafts, and transfer means drive connecting all of said support shafts so that the center lines of all of said eccentric sections are parallel with each other and rotate in unison.

5. The speed reducer of claim 4, said drive means comprising a first stage speed reduction unit, the output of which is connected to one of said support shafts.

6. The speed reducer of claim 1, comprising a cover plate fastened to said ring gear and adapted to support an element to be rotated with said ring gear.

7. The speed reducer of claim 1, wherein the number of teeth on said planet gear is slightly less than the number of teeth on said ring gear.

8. A speed reducer comprising a housing having end wall means and side wall means extending longitudinally from said end wall means and defining a cylindrical chamber having an open end, a ring gear mounted within said chamber for rotation about a central axis, said ring gear having a plurality of internal teeth tapered axially inwardly toward said end wall means, a planet gear mounted within said ring gear and having a plurality of external teeth which mesh with and match the taper of said internal teeth on said ring gear, means mounting said planet gear for orbital motion within said ring gear comprising a mounting plate spaced from said end wall means and supported therefrom, a plurality of support shafts each rotatably mounted in said support plate and said end wall means on an axis parallel to said central axis, each support shaft having an eccentric section located between said support plate and said end wall means and extending through and rotatable with respect to said planet gear, adjustment means including a plurality of adjusting screws extending through said end wall means to set the axial position of said planet gear relative to said ring gear, a plurality of springs mounted on said support plate and urging said planet gear toward said adjusting screws to maintain said planet gear in its set axial position, drive means connected to one of said support shafts, transfer means drive connecting all of said support shafts so that the center lines of all said eccentric sections are parallel with each other and rotate in unison, whereby rotation of said support shafts causes orbital movement of said planet gear within said ring gear to cause rotational movement of said ring gear about said central axis.

9. The speed reducer of claim 8, whereby said adjusting screws are readily accessible from outside said housing and may be adjusted to permit said planet gear to move toward said end wall means along the taper of the teeth to eliminate backlash between the teeth on said ring gear and said planet gear.

10. The speed reducer of claim 8, said mounting means comprising first and second support rings on opposite sides of said planet gear in sliding engagement therewith, said springs engaging against said first support ring and said adjusting screws engaging against said second support ring.

11. The speed reducer of claim 8, each of said adjusting screws including a head located outside said housing and said adjusting means further comprising a spacer between the head of each of said screws and said end wall means to set the desired axial position of said planet gear.

12. The speed reducer of claim 8, said drive means comprising a first-stage speed reduction unit, the output of which is connected to one of said support shafts.

13. The speed reducer of claim 8, comprising a cover plate fastened to said ring gear for closing said open end of said chamber and adapted to support an element to be rotated with said ring gear.

14. The speed reducer of claim 8, wherein the number of teeth on said planet gear is slightly less than the number of teeth on said ring gear.

* * * * *